April 18, 1944.   H. F. PATTERSON   2,347,121
FLUID COUPLING
Original Filed June 9, 1939   2 Sheets-Sheet 1
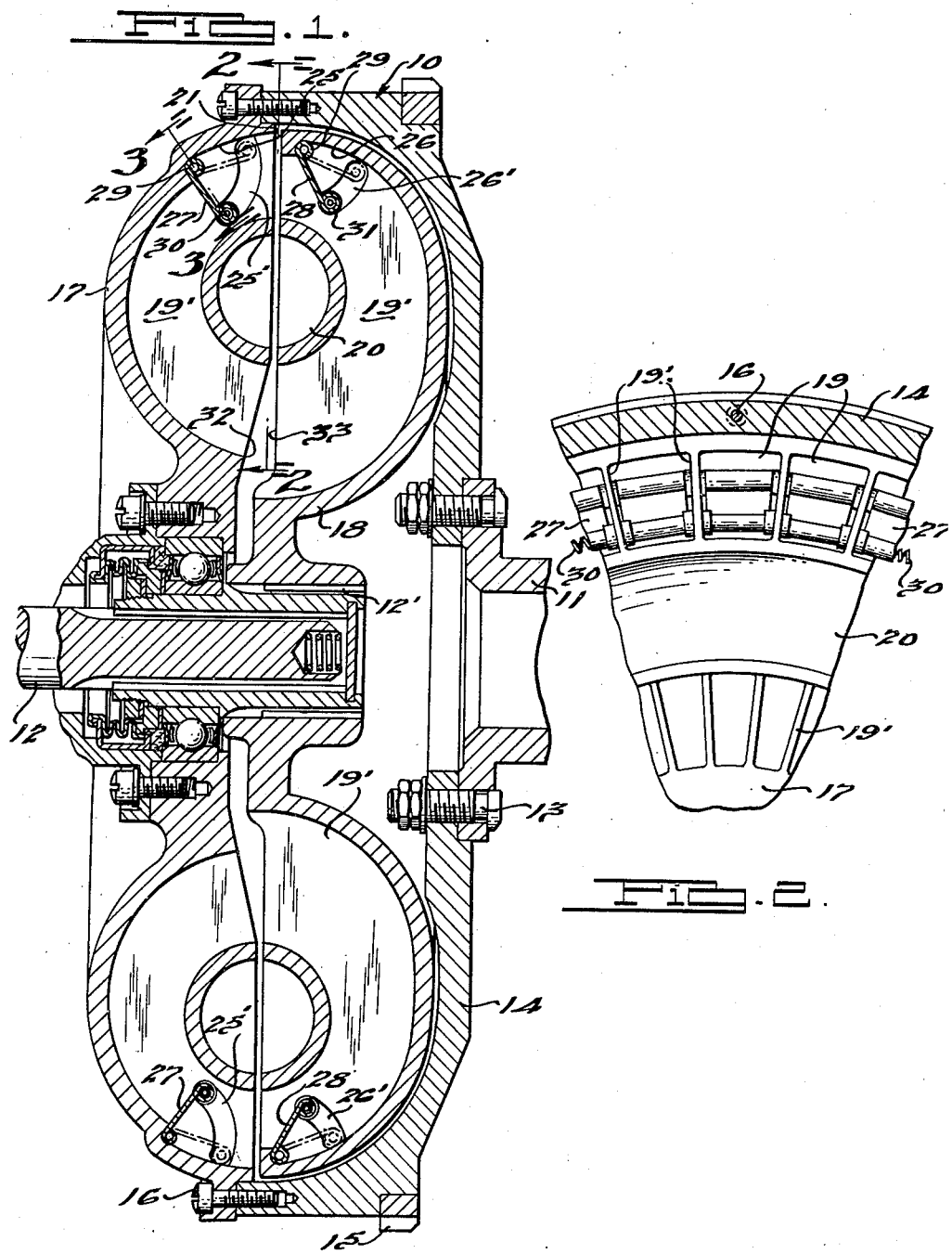
INVENTOR
Herbert F. Patterson.
BY
ATTORNEYS.

April 18, 1944.　　　H. F. PATTERSON　　　2,347,121
FLUID COUPLING
Original Filed June 9, 1939　　2 Sheets-Sheet 2

INVENTOR
Herbert F. Patterson.
BY
Harness, Dickey, Pierce & Harris
ATTORNEYS.

Patented Apr. 18, 1944

2,347,121

UNITED STATES PATENT OFFICE 2,347,121

FLUID COUPLING

Herbert F. Patterson, Detroit, Mich., assignor to Chrysler Corporation, Highland Park, Mich., a corporation of Delaware Original application June 9, 1939, Serial No. 278,185, now Patent No. 2,267,476, dated December 23, 1941. Divided and this application September 10, 1941, Serial No. 410,229

7 Claims. (Cl. 60—54)

This application is a division of my copending application Serial No. 278,185, filed June 9, 1939, now Patent No. 2,267,476, granted December 23, 1941, which application is a continuation-in-part of my copending application, Serial No. 237,893, filed October 31, 1938, and now abandoned.

This invention relates to power transmitting devices and refers more particularly to fluid couplings, clutches, drives and the like.

Heretofore in motor vehicle power transmission systems employing fluid couplings between the motor and the final drive mechanism, difficulty has been experienced by reason of the tendency of the vehicle to "creep" or drive slowly when the engine is idling and the transmission is in gear. In other words, it has been found necessary in bringing the vehicle to rest, to manipulate the transmission into neutral or to apply the usual brakes to oppose the drive or drag transmitted through the fluid coupling at engine idling speed.

The principal object of the invention is to eliminate the aforesaid difficulty by providing an improved fluid coupling having a fluid control member by means of which the fluid flow between the passages of the impeller and runner members may be automatically and effectively controlled in such manner that, at engine idling speed, there is substantially no circulation of fluid between the impeller and runner.

Another object of the invention is to provide a fluid coupling of this character having a fluid control member which is responsive to predetermined speeds of rotation of at least one of the rotating members of the coupling.

Another object of the invention is to provide a fluid coupling having a fluid control member the position of which is controlled by the action of the fluid.

Another object of the invention is to provide a control mechanism for a fluid coupling of this character which is housed substantially within the fluid passages of the impeller and runner structures in such a manner that the overall length of the fluil coupling need not be increased.

A further object of the invention is to provide a fluid coupling in which the flow of fluid between the passages of the impeller and runner members is automatically interrupted whenever the speed of the runner exceeds that of the impeller.

Further objects and advantages of the invention will be apparent from the following detailed illustrative embodiments of the principles of the invention, reference being had to the accompanying drawings, in which:

Fig. 1 is a sectional view axially through the improved fluid coupling.

Fig. 2 is a vertical sectional view taken on the line 2—2 of Fig. 1.

Figure 3:
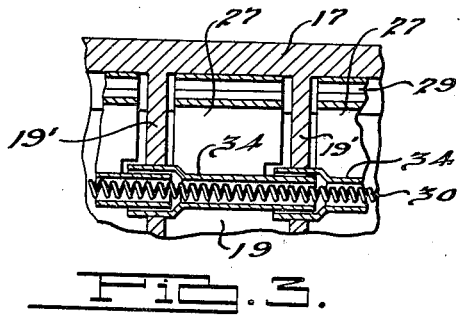
Fig. 3 is an enlarged sectional view taken approximately as indicated by the line 3—3 of Fig. 1.

In the form of the invention illustrated in the drawings, referring specifically to Fig. 1, the improved fluid coupling, generally designated by the numeral 10, is adapted to transmit a drive between a power driving shaft 11, such as an engine crankshaft, and a driven shaft 12. The driving shaft 11 is drivingly connected at 13 to a flywheel 14 having starter teeth 15 adapted for engagement with the usual engine starting device (not illustrated herein but of well known construction). The flywheel 14 has fixed thereto by means of the bolts 16 an impeller or driving member 17 of the fluid coupling. The driven shaft 12 corresponds to the driving shaft which ordinarily connects the clutch of a vehicle to the transmission mechanism thereof. A runner or driven member 18 of the fluid coupling 10 is non-rotatably mounted on the driven shaft 12 by means of the splined connection 12'.

Formed in the impeller and runner structures 17 and 18, respectively, are a plurality of vanes 19' forming passages or chambers 19 (best shown in Fig. 2) which extend around an annular vortex chamber or space 20 so that as the impeller rotates, the fluid will be thrown outwardly to a point generally designated at 21 and toward the passages 19 of the runner 18, thereby inducing rotation of the latter as is generally well known in the art. The vanes 19' may be cast integrally with the shell (as illustrated) or the shell and vanes may be stamped from sheet material whereupon the vanes are welded in place.

A series of annularly arranged recesses 25 and 26 are formed on the inner face of the impeller and runner structures respectively and a plurality of circumferentially spaced gate elements 27 and 28 are pivotally mounted at one end as at 29 within the recesses 25 and 26. The other ends of the respective elements 27 and 28 are interconnected by annular coil springs 30 and 31 respectively. The elements 27 and 28 have tubular portions 34 which extensibly telescope each other and house the springs 30 and 31 (see Fig. 3). Arcuate slots 25' and 26' are provided in each of the vanes 19' of the impeller and runner respectively to accommodate swinging of the gate elements 27, 28. The elements 27 and 28 are normally yieldingly maintained in their illustrated position of Fig. 1 in which the fluid within each of the passages 19 of the impeller is disrupted principally by the elements 27 when the impeller is rotating at a faster rate than the runner structure although at a relatively low speed. If the runner member 18 rotates at a faster speed than the impeller, the fluid in each of the passages 19 of the runner is disrupted by reason of the elements 28. The elements 27 and 28 are so constructed and arranged with respect to the vanes 19' of the impeller and runner members 17 and 18 respectively that when the impeller rotates at a sufficiently high speed the elements 27 and 28 are swung outwardly by the impinging fluid about their pivot 29 and into the recesses 25 and 26. When the elements 27 and 28 are held in the recesses 25 and 26 by the impinging fluid, the elements are out of fluid interrupting relationship with the passages and do not impede the travel of the fluid.

It is normally desirable to fill the fluid coupling to about three fourths of its capacity, the fluid being oil, water or other suitable material.

In the operation of this particular embodiment of the invention, when the driving shaft 11 is rotating faster than the driven shaft 12 but at a relatively low speed, as is the case when the vehicle is at rest or running at a slow speed, the elements 27 and 28 are maintained in their fluid interrupting condition of Fig. 1 by the action of the coil springs 30 and 31 wherein they simultaneously interrupt the fluid flow in each of the passages of the impeller and runner structures 17 and 18, respectively. This interruption of fluid flow in the passages lowers the energy transmitted to the runner 18, and consequently effects greater slippage between the impeller and the runner. This action makes it unnecessary to manipulate the transmission into neutral, or to apply the brakes of a motor vehicle in order to hold the latter at rest. If desired, a baffle or offset portion 32 may be used to assist the function of the baffle elements 27 and 28. When the vehicle operator increases the speed of the driving shaft 11 to a predetermined speed, the centrifugal force on the fluid within the coupling becomes greater and greater and consequently forces the fluid in its well known travel in the outer portions of the passages 19. In other words, the impeller 17 will rotate with the driving flywheel 14 to cause the fluid to circulate under the action of centrifugal force outwardly through the impeller passages for discharge in the space 21 where the fluid enters the runner passages for discharge at the space 33. The runner is thus driven from the impeller and the slippage between the parts rapidly diminishes as the speed of the impeller increases, and this increased fluid flow impinges against the elements 27 and 28 to urge them outwardly and into the recesses 25 and 26 and thus out of the path of the fluid flow.

When, under certain conditions, the driven shaft 12 overruns the driving shaft 11, as when the vehicle is coasting, the flow of fluid between the coupling elements is reversed and the fluid then flows outwardly through the runner passages for discharge in the space 21 where the fluid enters the impeller passages for discharge at the space 33. The fluid then impinges on an outer surface of the gate elements 28 and swings them downwardly about their pivots 29 to thereby disrupt the fluid flow tending to move from the runner at the space 21. The coil springs 30, 31 are of such strength that they tend to maintain the gate elements in fluid disrupting position at low motor speeds but permit the fluid to swing the gate elements out of fluid disrupting position at speeds above the motor idling speed. Centrifugal force acting directly upon the gate elements will, of course, have a tendency to maintain said elements out of fluid disrupting position at high rotational speeds regardless of the direction of fluid flow. The force of the fluid impinging upon the outer surface of the elements 28 during coasting, however, is sufficient to overcome this tendency and will swing the elements 28 into the position shown in Fig. 1 regardless of the speed of rotation.

During overrunning action of the runner, the elements 27 may also assist the elements 28 in breaking up the flow of fluid from the runner to the impeller. This arrangement of the elements 27 and 28 is particularly effective by reason of their being arranged in the coupling members at a location on the fluid coupling that is at least as far from the axis thereof as the outer diameter of the vortex chamber 20, and thereby are adapted to efficiently control the fluid flow at substantially the maximum outer diameter of the passages just before the fluid of the impeller imparts its maximum energy to the runner.

It is evident that the improved fluid coupling with its self-contained elements 27 and 28 and springs 30 and 31 housed entirely within the fluid passages of the impeller and runner members can be easily balanced and maintained in balance and moved as a unit. This feature is of advantage in motor vehicle installations where it may be desirable to remove the coupling when overhauling or repairing the motor or transmission. It is to be understood that the fluid actuated elements may be used in but one of the impeller and runner structures and the effective lengths of these elements may be varied as desired.

Figure 4:
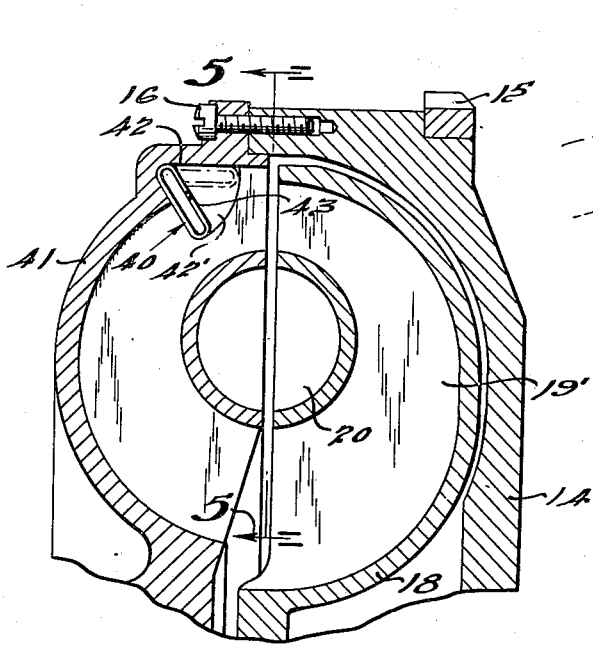
Fig. 4 is a fragmentary sectional view corresponding to Fig. 1 but illustrating a modified form of the invention.
Figure 5:
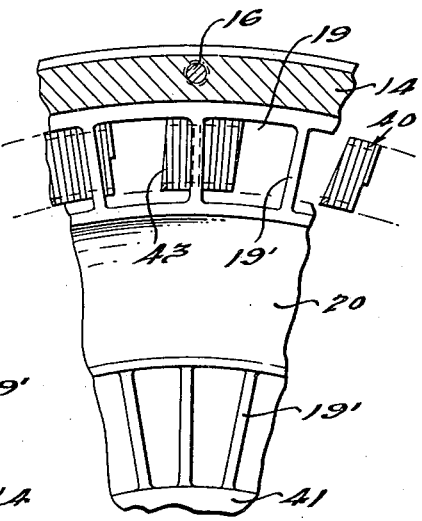
Fig. 5 is a fragmentary vertical sectional view taken as indicated by the line 5—5 of Fig. 4.

Referring now to Figs. 4 and 5 wherein is illustrated a somewhat modified embodiment of the invention, it will be understood that many of the parts correspond to parts previously described and shown in Figs. 1 to 3 and the entire mechanism will not again be described in detail. It will be noted that the elements 27 and 28 and the springs 30 and 31 of the Fig. 1 embodiment have been omitted, and an annularly arranged continuous flattened spring 40 has been substituted therefor. It is to be understood that although but one spring 40 is shown in the Fig. 4 embodiment, another may be employed within the runner member 18 without departing from the bounds of the invention.

To receive the fluid control mechanism, the impeller member 41 has formed on its inner face an annular groove 42 within which the spring 40 is suitably fixed in such manner that it is adapted to swing in the arcuately shaped opening 42' provided in the vanes 19' of the impeller. The spring 40 comprises a plurality of finger portions 43 which are normally yieldingly urged by the inherent resiliency of the spring itself into the position illustrated in Fig. 4. The flat faces of the finger portions 43 oppose the passage of fluid simultaneously within all of the passages 19 of the impeller member 41. As the impeller rotates at an increasing speed, the fluid within the impeller impinges on the flat faces of the finger portions 43 and urges the finger portions outwardly into the groove 42 until, at a critical and predetermined speed, the spring 40 lies flat against the surface of the groove 42.

Upon reversal of fluid flow, as occurs when the runner drives the impeller, the action of the spring 40 is similar to that just described in connection with the gate elements 28 of Fig. 1.

Although but a few specific embodiments of the invention are herein shown and described, it will be understood that various changes in the size, shape and arrangement of parts may be made without departing from the spirit of the invention.

I claim:

1. A fluid coupling comprising relatively rotatable impeller and runner members each of which is of semi-toroidal form and is provided with regularly spaced radial vanes interrupted by a vortex chamber circumferentially disposed between the axial and peripheral extremities of the vanes, thereby to provide cyclic coupling fluid passages between the members, and means for disrupting the flow through the passages comprising a plurality of gate elements mounted in at least one of said members, said gate members being mounted between the vanes defining each passage for swinging movement from a position transverse thereof into a position substantially continuous with the flow path defined by the wall of the member, and spring means incorporated with each gate element and biased to urge the element into its transverse and flow-disrupting position.

2. The fluid coupling of claim 1, wherein the vanes are formed with arcuate slots adjacent their peripheral portions, and the gate elements are provided with means entering said slots to guide the gate elements in their swinging movement.

3. The fluid coupling of claim 1, wherein the wall of the coupling member in which the gates are mounted is formed with recesses into which the gates may swing thereby to attain smooth continuity of the passage wall boundaries when the gates are in their open position.

4. A fluid coupling comprising relatively rotatable impeller and runner members each of which is of semi-toroidal form and is provided with regularly spaced radial vanes interrupted by a vortex chamber circumferentially disposed between the axial and peripheral extremities of the vanes, thereby to provide cyclic coupling passages between the members, and flow-disrupting gates pivotally mounted between the vanes of said members adjacent the peripheral extremities thereof, said gates being positioned transversely of said passages and being pivoted for swinging movement to a position substantially continuous with the flow path defined by the walls of said members, and spring means incorporated with each gate element and biased to urge the element to its transverse position, said gates being further so mounted as to tend to open when flow occurs in one direction of rotation, the gates on at least one of said members being additionally hydraulically urged to their transverse position when flow occurs in the opposite direction.

5. A fluid coupling comprising relatively rotatable impeller and runner members each of which is of semi-toroidal form and is provided with regularly spaced radial vanes interrupted by a vortex chamber circumferentially disposed btween the axial and peripheral extremities of the vanes, thereby to provide cyclic coupling passages between the members, and flow-disrupting gates pivotally mounted between the vanes of at least one of said members and transversely of the passages, said gates being formed at one end with tubular portions, said vanes being formed with arcuate slots in line with the path of motion of the tubular portions of the gates about their pivotal mountings, and a continuous coil spring disposed in said tubes and circumferentially of said member to urge said gates into flow-disrupting position.

6. The fluid coupling of claim 5, wherein the tubular portions are formed with large and relatively small ends which telescopically engage the ends of adjacent gates at the region of the slots formed in said vanes.

7. A fluid coupling comprising relatively rotatable impeller and runner members each of which is of semi-toroidal form and is provided with regularly spaced radial vanes interrupted by a vortex chamber circumferentially disposed between the axial and peripheral extremities of the vanes, thereby to provide cyclic coupling passages between the members, and flow-disrupting gates pivotally mounted between the vanes of at least one of said members for swinging movement from a position transverse of the passages to a position substantially continuous with the flow path defined by the wall of said member, said gates comprising a flattened annular coil spring normally urged by its own tension into its transverse and flow-disrupting position.

HERBERT F. PATTERSON.